United States Patent [19]

De Monsy et al.

[11] 3,823,250

[45] July 9, 1974

[54] METHOD AND APPARATUS FOR CONSTRUCTING INSULATED CABLE PRESSURE BLOCKS

[75] Inventors: Richard L. De Monsy, Encino; Norman K. Hankins, Northridge, both of Calif.

[73] Assignee: Hexcel Corporation, Dublin, Calif.

[22] Filed: June 18, 1973

[21] Appl. No.: 371,080

[52] U.S. Cl............... 174/23 R, 156/48, 174/135, 285/22, 285/197, 285/297
[51] Int. Cl.... H02g 15/20, H01b 7/28, H01b 13/00
[58] Field of Search............ 174/8, 20, 21 R, 22 R, 174/23 R, 23 C, 76, 135; 138/99; 156/48; 285/21, 22, 197, 292, 293, 294, 297

[56] References Cited
UNITED STATES PATENTS
| | | | |
|---|---|---|---|
| 3,188,121 | 6/1965 | Cude et al. | 285/197 |
| 3,215,761 | 11/1965 | Gelpey | 174/76 X |
| 3,290,194 | 12/1966 | Gillemot | 156/48 |

*Primary Examiner*—Laramie E. Askin
*Attorney, Agent, or Firm*—Townsend and Townsend

[57] ABSTRACT

A sheath surrounding a multi-wire cable is opened to expose the cable core and a flexible cover sheet is placed over the resulting cut-out to cover the cut-out. The sheet is biased against the cut-out by taping it thereto and it includes an inlet port communicating the exterior of the cable with the cut-out in the sheath. An interior side of the sheet is concavely curved and has intermittent protrusions which space the sheet from the core to define passageways which communicate with the port opening so that block forming material, such as self-setting plastic can be injected into the passageways and hence into and around the multi-strung cable core. After the plastic sets, it forms a gas tight barrier or pressure block within the cable. The flattened cover sheet has a generally rectangular configuration and side dimensions of at least about 4 inches for coverage of a cut-out having side lengths of at least about 3 inches. The longitudinal center line of the sheet (parallel to the cable axis) has an increased cross-section as compared with remaining portions of the sheet to resist center flattening of the sheet when biased against the cable to enhance the formation of passageways between the concave sheet side and the cable core and to resist collapse of the sheet and a resulting destruction of the passageways.

16 Claims, 3 Drawing Figures

PATENTED JUL 9 1974  3,823,250
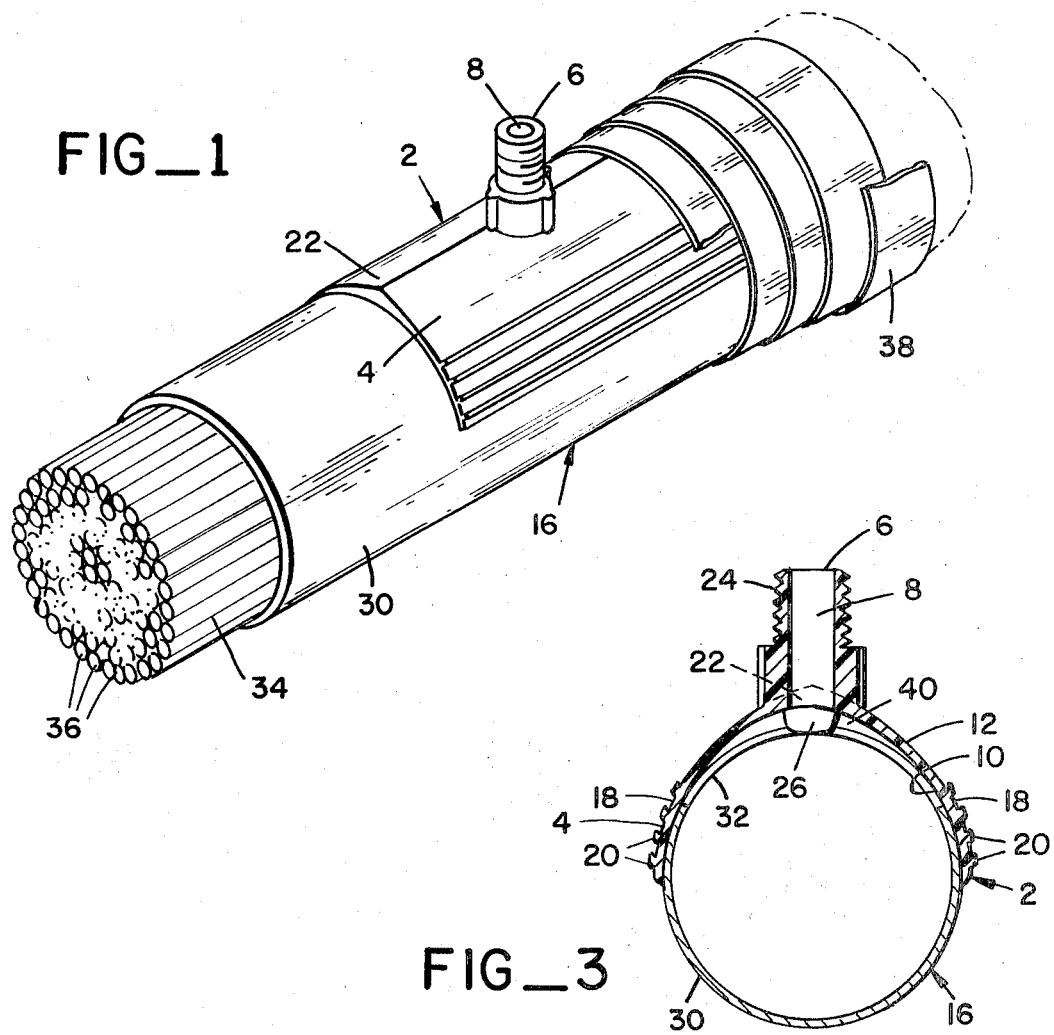
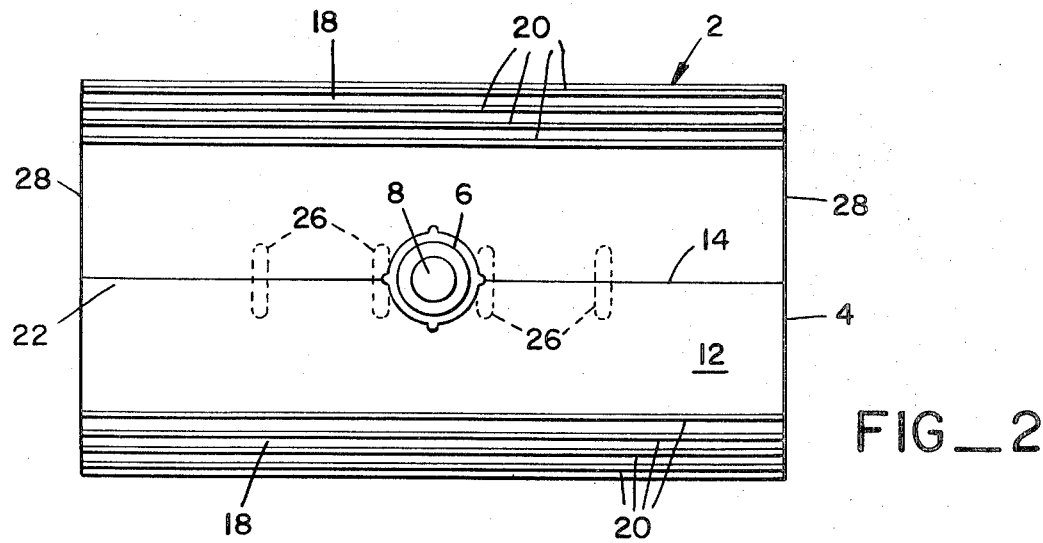

METHOD AND APPARATUS FOR CONSTRUCTING INSULATED CABLE PRESSURE BLOCKS

BACKGROUND OF THE INVENTION

This invention generally relates to the formation of gas tight pressure blocks in multiple wire or conductor electric cables such as telephone cables to enable the air pressurization of sections of such cables. As is well known in the art, such air pressurization prevents the seepage of water or moisture into the cable and resulting noise and interference in communication circuits.

The pressure blocks are in effect dams formed at intermittent points over the length of the cables by injecting a liquid material which hardens and fills the space around the wires over a sufficient length to hold the air pressure. To form such a pressure block it is necessary to make an opening in the cable sheathing leading to the interior, and then provide an exteriorly positioned fitting which must be tightly secured to the sheet.

U.S. Pat. No. 3,188,121, the disclosure of which is incorporated herein by reference, discloses and claims a useful fitting for making such pressure blocks. Briefly speaking, the fitting disclosed in that patent provides a base molded from a flexible and pliable material such as rubber or pliable rubberlike synthetic plastic material of approximately a square configuration. A riser or port fitting is centered on the sheet, communicates one side of the sheet with the other, and provides means for attaching a pressurized source of the blocking material, e.g. liquid plastic. The sheet is molded to a curvature which approximates the curvature of the cable and the concave side of the sheet is provided with a gasket for securing the sheet to the cable sheath.

In practice, the rectangular sheet of the fitting described in the patent had an approximate size of about 2½ inches by 2½ inches, when the sheet is flattened, and a thin (e.g. 1/16 of an inch), uniform cross-section. The cutout which could be covered with that fitting was relatively small due to the fact that the adhesive gasket has a substantial width and had to be placed around the opening. It was the general consensus that the available opening in the cable sheath was ample since it was many times greater than the opening in the port fitting.

With such prior art fittings it was at times difficult to form a tight sealing pressure block. It was believed that a too quickly setting or too viscous plastic fluid or low temperatures or inadequate injection pressures and the like were responsible for failures to establish a gas tight pressure block.

SUMMARY OF THE INVENTION

The present invention provides a cable sheath pressure tap fitting for constructing pressure blocks in air pressurized multi-wire cables which are air-tight irrespective of the setting time of the plastic fluid, the ambient temperature, a relatively low injection pressure and the like. Consequently, as compared with pressure blocks formed in accordance with the prior art, pressure blocks constructed in accordance with the invention have a much lesser incidence of air leakage.

The higher quality pressure blocks obtained with the present invention are due to a number of factors. First, as compared to the prior art and in particular the fitting disclosed in the above-referenced U.S. patent the fitting of the present invention has a base sheet that is substantially larger than that of prior art fittings. It has a generally rectangular configuration with minimum side lengths of at least about 4 inches and perferably with a short side length of about 4 inches and a long side length of about 4.75 to 5 inches. For the purposes of this disclosure and the appended claims the term "rectangular configuration" is intended to mean, means and includes rectangular as well as generally square configurations and is not limited to either one.

This larger base sheet size enables a corresponding enlargement of the cut-out in the cable sheath up to about 3 by 4 inches. It has been found that such an enlargement of the cut-out in the cable sheathing, without enlarging the port size, substantially facilitates the penetration of the cable core by liquid plastic material and virtually assures an air tight pressure block.

Secondly, the fitting of the present invention includes a plurality of rib-like protrusions which are spaced symmetrically with respect to the inlet port along the longitudinal center line of the base sheet and which are further oriented perpendicular to the center line. The protrusions have a length substantially greater than their thickness but they extend over only a fraction of the total base sheet width. When the sheet is positioned over the cut-out, the protrusions space an interiorly facing concave side of the base sheet from the cable core. Direct contact between the sheet and the core is thereby prevented. Instead, open, low flow resistance passages are formed through which the liquid plastic material injected into the port can flow.

In the past no such protrusions were provided. Whenever the base sheet was biased towards the cable core, as by wrapping tape around the cable and over the sheet, the sheet, in the vicinity of its center line at least where the inlet port is located, was deflected and frequently collapsed into direct contact with the cable core, thereby blocking the free flow of plastic injected through the port. Consequently, very substantial pressure had to be supplied to overcome this flow resistance which was then unavailable to fully and completely penetrate the cable core with the plastic material.

Thirdly, the fitting of the present invention resists possible collapse of the base sheet when biased against the cable by thickening the cross section of the sheets in the vicinity of the longitudinal (with respect to the cable length) center line of the sheet. The remainder of the sheet remains relatively thin and pliable to readily conform it to the exterior cable configuration and assure the formation of a seal with the cable sheath.

In the prior art, the base sheet had a uniform thickness which contributed to the likelihood of base sheet deflection or collapse at the longitudinal center of the sheet. A base sheet collapse, however, blocks or at least greatly reduces the cross section of the flow passages for the injected liquid plastic material. Consequently, there is a significant pressure drop in the injected plastic and a reduced penetration of the cable by the plastic.

Thus, the present invention provides a cable sheath pressure tap fitting for constructing cable pressure blocks which greatly reduces or substantially eliminates any probability that the formed pressure block has a leakage. In the past, leakages were relatively frequent. Such leakage, however, is a serious problem since air pressure in the cable cannot be maintained without a constant supply of additional pressurized air. Frequently the air supply is not available making it necessary to form another pressure block adjacent the leaking block.

BRIEF DESCRIPTION OF THE DRAWINGS

FIG. 1 is a fragmentary, perspective view of a plastic sheath covered multi-wire cable provided with apparatus for constructing a pressure block in accordance with the present invention;

FIG. 2 is an enlarged plan view of the cable sheath pressure tap fitting constructed in accordance with the present invention; and FIG. 3 is a side elevation view, in section, of the fitting illustrated in FIG. 2 and shows its relative positioning on the cable.

DESCRIPTION OF THE PREFERRED EMBODIMENT

Referring to the drawings, a cable sheath pressure tap fitting 2 constructed in accordance with the invention comprises a base sheet 4 which has a substantially rectangular configuration and, rising from about the center of the base sheet, a port 6 that includes an opening 8 communicating a first concave, inwardly facing side 10 of the sheet with a second, convex opposite facing side 12. The fitting is preferably molded from a resilient, flexible and pliable material such as rubber or a pliable, rubber-like synthetic plastic material such as high density polyethylene. The base sheet has minimum side lengths of about 4 inches and in the preferred form it has a long side length of 4.75 to 5 inches and a transverse width of about 4 inches.

The base is preferably arcuately molded and symmetric about a longitudinal center line 14 that is parallel to the axis of a cable 16 with which the fitting is used as described below. In the vicinity of the center line, the base sheet has a relatively small curvature radius and thereafter terminates in side portions 18 that are flat in their relaxed form and angularly inclined with respect to each other. The exterior surface of the side portion includes a plurality of longitudinally oriented, spaced apart ribs 20. The base sheet has a constant thickness of between about 1/32 to about 1/16 of an inch except that in the vicinity of center line 14 it has about twice that thickness, as best shown in FIG. 3, for purposes more fully described hereinafter.

Port 6 includes external threads 24 for connection of the fitting to a liquid plastic injection gun (not separately shown) or the like and for closing the port with a suitable cap (not shown in the drawings) after use.

Concave surface 10 of the base sheet is fitted with a plurality of spaced apart ribs 26 which have a length many times their width and which are oriented perpendicular to the longitudinal center line 14 of the fitting, that is parallel to the plane of curvature of the sheet. The ribs are symmetrically spaced with respect to both port 6 and center line 14 and they are arranged from the port progressively further towards ends 28 of the sheet. In the preferred embodiment of the invention in which the sheet has dimensions of approximately 4 inches by 4¾ inches (in its flattened configuration) the ribs have a thickness of approximately one-eighth of an inch, a length of about ½ inch and a center spacing of about five-eighths of an inch.

Turning now to the use of fitting 2 in forming cable pressure blocks in accordance with the present invention, exterior sheath 30 of cable 16 is cut open to form a generally rectangular cut-out 32 and provide radial access to cable core 34 defined by a multiplicity of longitudinal, side-by-side conductors or wires 36. The cut-out has a generally rectangular configuration and a maximum longitudinal extent of 3 to 3¾ inches and a maximum transverse extent of about 3 inches. Any shield material, such as steel, copper, aluminum, rubber, plastic and core wrap paper and ribboned and stranded core binders between the cable core and the cable sheath in the area of cut-out 32 is also removed. As is well known in the art, channeling pins (not separately shown) are inserted into the cable core to facilitate the flow of pressurized liquid plastic into and around the core and thus facilitate the formation of a pressure block.

Base sheet 4 of fitting 2 is now aligned with the cut-out and tape 38 is tightly wrapped around the cable and the sheet on both sides of port 6 to conform the sheet side portions 18 to the exterior configuration of the cable and simultaneously seal the cut-out in the cable sheath. The partly wound tape firmly biases the base sheet towards the cable and ribs 26 space concave surface 10 from cable core 34 to thereby define passageways 40 between the core and the base sheet in communication with port opening 8.

An injection gun (not separately shown) is now threaded to port 6 and operated to create a flow of pressurized, self-setting plastic material through port opening 8, passageways 40 and cut-out 32 into and around cable core 34. The liquid plastic material flow emanating from port hole 8 flows with little resistance along the passageways created by ribs 26 over the full length and width of cut-out 32 and hence into the cable core. There is virtually no pressure drop in the passageways so that all pressure applied by the pressure gun fitted to port 6 forces the liquid plastic material into and around the core.

A wide variety of self-setting plastic materials can be employed. Four particularly suitable materials are available on the market from the Rezolin Division of Hexcel Corporation, 20701 Nordhoff Street, Chatsworth, Calif. 91311 under the trademarks 170 and 170 LT COMPOUNDS, and 164 and 164 LT COMPOUNDS.

After sufficient plastic material has been injected through port 6, e.g., by injecting a pre-measured quantity from a cartridge, for example, the injection gun is removed and port 6 is closed with a cap (not separately shown). The injected liquid plastic is permitted to set and harden for a sufficient time, as determined by the type of plastic material used as well as the ambient temperature, and thereafter the cable sections adjoining the formed pressure plug can be filled with pressurized air.

What is claimed is:

1. A cable sheath pressure tap fitting for placement over a cable having cable core surrounded by an outer sheath comprising a curved base sheet having a concave side for placement against the cable sheath and a convex side, means defining an injection port projecting from the convex side communicating the convex side to the concave side, and means integrally constructed with the sheet for spacing a substantial portion of the concave side including the port from the cable core when the sheet is biased towards the core to facilitate the flow of fluid material beneath the concave side and into the cable core.

2. A fitting according to claim 1 wherein the sheet is curved in only one direction and substantially straight in another, perpendicular direction for placement over cylindrical cables, wherein a center portion of the sheet has an arcuate configuration, and wherein the means for spacing the concave side from the core simultaneously defines stiffening means for the sheet resisting a flattening of the center portion.

3. A fitting according to claim 2 wherein the resisting means comprises a portion of the sheet extending over the center portion and having a thickness greater than the thickness of the remainder of the sheet.

4. A fitting according to claim 1 wherein the spacing means comprises a protrusion depending perpendicularly away from the concave side for engaging the cable core and thus spacing the concave side therefrom.

5. A fitting according to claim 4 including a plurality of independent, spaced apart protrusions.

6. A fitting according to claim 5 wherein the protrusions are arranged symmetrically with respect to the port defining means.

7. A fitting according to claim 6 wherein the protrusions are symmetric with respect to a center line of the sheet.

8. A cable sheath pressure tap fitting comprising a simply curved sheet constructed of a deformable material and including a straight longitudinal center line perpendicular to the plane of curvature of the sheet, a port protruding from a convex side of the sheet disposed at about the center of the sheet and defining an opening communicating the convex side with a concave side of the sheet, and a plurality of ribs protruding from the concave side and disposed in the vicinity of the opening, the ribs having a length substantially greater than their width for engaging and spacing the concave side from a cable core when the fitting is placed over a cable to facilitate the flow of fluid from the opening to the cable core.

9. A fitting according to claim 8 wherein the rib lengths are oriented parallel to the plane of curvature of the sheet.

10. A fitting according to claim 9 wherein the ribs are substantially symmetric with respect to the longitudinal center line of the sheet, and wherein the ribs have a length substantially less than the width of the sheet measured parallel to the rib length.

11. In combination a cable having a multiplicity of conductors defining a cable core, a sheath surrounding the core and having a generally rectangular, longitudinally oriented cut-out of at least about 3 inches in length and a width of no more than about 3 inches, and a fitting for constructing pressure blocks in the cable comprising a flexible sheet placed over the cut-out, having a generally rectangular configuration and dimensioned to completely overlap the cut-out, means biasing the sheet against the sheath to conform the sheet to the sheath configuration, a protrusion depending from the side of the sheet facing the core and engaging the core to thereby space the side from the core and define a passageway between the sheet and the core, and port means in fluid communication with the passageway defined by the sheet and positioned at about the center thereof for injecting a fluid material into the passageway and hence into and around the core to thereby form a pressure block with the injected material.

12. The combination according to claim 11 including a plurality of spaced-apart protrusions extending from the sheet towards and into contact with the core.

13. The combination according to claim 12 wherein the sheet includes an increased cross-section thickness extending over a longitudinal center portion of the sheet for resisting a full deformation of the sheet into conformity with the sheath configuration to thereby enhance the formation and maintenance of the passageway.

14. A method for constructing pressure blocks in shielded cables having a core of a multiplicity of conductors enclosed in a sheath, the method comprising the steps of:
   providing an access opening through the sheath to the core;
   placing a sheet over the core;
   spacing the sheet from the core over a portion of the length and circumference thereof to define passageways between the core and the sheet;
   injecting under pressure a fluid, self-setting plastic material into the passageways and hence into the core; and
   permitting the plastic material in the core to set and thereby form the pressure block.

15. A method according to claim 14 wherein the steps of providing an access opening and spacing the sheet comprise the steps of first removing a portion of said sheath surrounding the core from a part of the cable to form a cut-out, and thereafter covering the cut-out with the sheet, biasing the sheet against the core and maintaining a spacing between the sheet and the core thus defining the passageways.

16. A method according to claim 15 wherein the step of forming the cut-out includes the step of forming a cut-out of a generally rectangular configuration having minimum side lengths of about 3 inches.

* * * * *